(12) United States Patent
France

(10) Patent No.: US 9,044,796 B1
(45) Date of Patent: Jun. 2, 2015

(54) METHOD OF ENCAPSULATING WASTE

(71) Applicant: TDA Research, Inc., Wheat Ridge, CO (US)

(72) Inventor: Christopher Brian France, Arvada, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 0 days.

(21) Appl. No.: 14/206,811

(22) Filed: Mar. 12, 2014

Related U.S. Application Data

(60) Provisional application No. 61/779,105, filed on Mar. 13, 2013.

(51) Int. Cl.
*B09B 1/00* (2006.01)
*B09B 3/00* (2006.01)
*A62D 101/02* (2007.01)

(52) U.S. Cl.
CPC ........... *B09B 3/0033* (2013.01); *A62D 2101/02* (2013.01)

(58) Field of Classification Search
CPC ................................................. A62D 2101/02
See application file for complete search history.

(56) References Cited

U.S. PATENT DOCUMENTS

| | | | | |
|---|---|---|---|---|
| 4,795,764 A * | 1/1989 | Alm et al. | ...................... | 521/107 |
| 4,874,641 A * | 10/1989 | Kittle | ............................. | 427/244 |
| 5,026,735 A * | 6/1991 | Stern | ............................... | 521/50 |
| 5,276,255 A | 1/1994 | Stark | | |
| 5,318,730 A * | 6/1994 | Rieser et al. | ....................... | 588/8 |
| 5,360,632 A * | 11/1994 | Johnson et al. | ................ | 427/212 |
| 5,569,811 A * | 10/1996 | Dean | ............................. | 588/252 |
| 5,962,630 A | 10/1999 | O'Brien | | |
| 7,250,119 B2 | 7/2007 | Sayala | | |
| 2007/0298183 A1* | 12/2007 | Barzik | ....................... | 427/427.4 |

OTHER PUBLICATIONS

Lemieux, P. "BOTE Preliminary Results:" (2011), Durham, N.C.
Sharp J., et al. "Cemintitios System for Encapsulation of Intermediate level wastse" (2003) Oxford, Enland; Int. Conf. on radioactive waste manament and enviromntal. remediat.
Kalb, P et al. "Modified sulfur cement encapsulation of mixed waste contaminated incinerator fly ash" (1991) Waste Managment 11(3) pp. 147-153.
Brookhaven National Lab "Polyethylene Macroencapsulation: mixed waste focus area" U.S. DOE, Feb. 1998.

(Continued)

*Primary Examiner* — John Kreck
(74) *Attorney, Agent, or Firm* — Brian J. Elliot

(57) ABSTRACT

A method of encapsulating and safely transporting hazardous waste is disclosed. The method comprises the steps of: first, providing a waste object at a first location; second, covering the waste object with a closed cell polymer foam; third, allowing a sufficient time for the closed cell polymer foam to cure; and fourth, transporting the covered waste object to a second location. In another embodiment the method comprises the steps of: first, providing a waste object at a first location; second, treating the waste object to decontaminate or neutralize the hazardous waste; third, covering the waste object with a closed cell polymer foam; fourth, allowing a sufficient time for the closed cell polymer foam to cure; and fifth, transporting the covered waste object to a second location.

22 Claims, 8 Drawing Sheets

(56) References Cited

OTHER PUBLICATIONS

EPA Method 1311 "Toxicity Characteristic Leaching Procedure" Jul. 1992.

Brian France "Encapsulating Waste Disposal Methods" Jun. 18, 2013, poster presented at U.S. EPA SBIR Phase I Kick-off Meeting.

\* cited by examiner

METHOD OF ENCAPSULATING WASTE

CROSS REFERENCE TO RELATED APPLICATIONS

The present application claims the benefit of the provisional application No. 61/779,105, filed Mar. 13, 2013 (titled METHOD OF ENCAPSULATING WATE, by Christopher Brian France), which is incorporated by reference herein. Provisional application No. 61/779,105 is not admitted to be prior art with respect to the present invention by its mention in the background or cross-reference section.

STATEMENT REGARDING FEDERALLY SPONSORED RESEARCH OR DEVELOPMENT

This invention was made using U.S. government funding through the U.S. Environmental Protection Agency contract No. EP-D-13-028. The government has certain rights in this invention.

BACKGROUND OF THE INVENTION

The release of chemical or biological agents over a large urban area would be devastating. The amount of contaminated homes, buildings, furniture, automobiles and all the materials within them that could never completely be decontaminated would generate a disposal waste load similar to a tornado ripping through the middle of a town, except that handling it could be life threatening. The worst items would probably be decontaminated in place, but tons of low level contaminated waste would have to be handled and transported to waste landfills, incinerators or other treatment facilities. The effort required to prevent further spread of the contamination during the transport of this contaminated material would be labor intensive and very costly; the EPA calculates that the cost of moving this contaminated waste could be several billion dollars (Lemieux, P., 2011. *BOTE Preliminary Results: Cost Analysis*. Durham, N.C., U.S. EPA Decontamination Research and Development Conference). A method to safely encapsulate the contaminated waste materials, thus preventing the spread of contamination and simplifying its handling and disposal, would speed up the recovery effort and significantly decrease the overall cost of the remediation. There is a need for a hazardous waste cleanup method that simplifies both the transport and disposal of materials that must be removed.

Solid waste encapsulation is known for immobilizing radioactive materials and toxic metals (lead, mercury); the reported process uses Portland cement. This encasement is not appropriate for solids contaminated with chemical or biological threats, because it adds excessive mass and eliminates combustion as the ultimate disposal method. Solid waste encapsulation for chemical or biological hazards must use materials and application methods to provide a barrier that encapsulates the chemical and biological contaminated materials, producing a solid waste that is not hazardous to transport and may be disposed of by less expensive methods than hazardous waste landfills. It is desirable to use the minimum weight and volume of material to simplify logistics and lower the application and transport cost, while producing a barrier that resists damage by handling during transport.

U.S. Pat. No. 5,276,255A, "Cementitious encapsulation of waste materials and/or contaminated soils containing heavy metals, to render them immobile" teaches a method of cementitious encapsulation of waste materials and/or contaminated soils containing heavy metals, to render them immobile, and particularly to the immobilization of metals, in regulated amounts, in such wastes.

Encapsulation processes to stabilize wastes for storage, transport or disposal include the use of Portland cement or related inorganic materials (Sharp, J., Milestone, N., Hill, J. & Miller, E., 2003. *Cementitios Systems for encapsulation of intermediate level waste*. Oxford, England, International conference on radioactie wast menagement and environmental remediation). This approach has been applied to radioactive wastes and those containing toxic metals such as mercury (Kalb, P., Heiser III, J. & Colombo, P., 1991. Modified sulfur cement encapsulation of mixed waste contaminanted incinerator fly ash. *Waste Management,* 11(3), pp. 147-153). In such cases this is a solution, because the contaminant cannot be detoxified by chemical means and must be stabilized for permanent storage. However, in the case of chemical or biological agents, the criteria are quite different. In this case the requirements are that contaminated waste be stabilized for interim storage and transport with minimal cost and weight (to lower the cost of transport), with simplified logistics, and preferably using combustible encapsulation materials so that the wastes can be incinerated after transport to a suitable incinerator or gasifier.

In a large-scale chemical or biological event it will be essential to transport a high volume of material that may be contaminated, but for which it would be too time-consuming and expensive to sample or decontaminate every item or batch. That consideration demands an effective barrier, which must be easy to apply and be capable of fitting on various shaped materials. Liquid polyethylene macroencapsulation is another hazardous waste encapsulation method, but it suffers from the limitation that it must be applied hot (as a polymer melt).

U.S. Pat. No. 5,962,630A "Process and material that encapsulates solid hazardous waste" teaches a method using a thermoplastic polymer and sulfur to encapsulate waste. A method (I) for encapsulating mixed waste comprises mixing a thermoplastic polymer (i) having a melting point temperature of less than 150° C., elemental sulfur (ii) and mixed waste (iii), at an elevated temperature of no greater than 200° C. The mixture is intimately mixed and then cooled to form a solid. An independent claim is also included for a composition of matter (II) comprising (i), (ii) and (iii). (i) is present at 2-10% by weight of (ii), and (iii) is present at up to 40% by weight.

U.S. Pat. No. 7,250,119B2 "Selective polymer wrapping of radioactive materials" teaches the encapsulation of radioactive particles and/or other materials partially or completely involves exposing radioactive particles or materials, to a precursor monomer solution. The monomer solution polymerizes in situ by the inherent radiation irradiated from the radioactive material, whereby partially or totally encapsulating the radioactive particles with the resulting polymer.

Polyethylene (PE) has previously been used to stabilize mixed wastes, in processes that add the PE at temperatures where it is liquid (typically above 250° F.). Example processes include microencapsulation, in which the waste is combined with molten plastic in an extruder to form a homogeneous mixture, which cools to a monolithic solid (Polyethylene Macroencapsulation: mixed waste focus area. U.S. Department of Energy, February 1998, by Brookhaven National Lab), and is incorporated by reference herein. A more recent development, suited to larger particle sizes, is termed macroencapsulation, and can be accomplished by liquefying the PE in an extruder and adding the liquid polymer to the waste in a suitable container. Again, cooling yields a solid. Polymer macroencapsulation is effective for radioactive lead solids and mixed waste debris, defined as "materials exceeding 60 mm in particle size." Under current regulations, lead-containing waste that is macroencapsulated through this process does not require performance testing such as EPA's Toxicity Characteristic Leaching Procedure (TCLP) (Brookhaven National Laboratory, 2009). This example demonstrates that appropriate macroencapsulation can transform a regulated waste into a material that is suitable for landfill disposal, and in some cases does not even require TCLP characterization for landfill disposal.

Due to the high cost of obtaining permits to transport hazardous wastes, costly alternatives have been investigated, including portable incinerators for on-site destruction. However, portable incinerators may not be allowed in sensitive locations, such as near populated urban areas or national monuments. In addition, testing of spore kill within a portable incinerator has shown that spores survive longer than expected; in some cases EPA tests showed only a 3-log reduction in viable spores. Therefore, portable incinerators may not offer the level of control required to ensure proper kill of bacterial spores (Dun, S. & Wood, J., 2009. *Report on the 2008 Workshop on Decontamination Research and Associated Issues for Sites Contaminated with Chemical, Biological, or Radiological Materials*, EPA/600/R-09/035). There was concern that the exhaust plume might actually spread the contamination. In addition these portable devices would only be capable of handling smaller materials such as protective clothing, not building materials. For the larger contaminated materials, ways and means to safely contain the wastes at low cost so they can be transported to large scale treatment facilities are required.

All of these references contain at least one of the following shortcomings: The method adds too much weight, the method cannot be used to encapsulate the waste object on site, the encapsulation cannot be applied at the ambient temperature of the contamination site, or the encapsulated objects cannot be incinerated because the encapsulating material cannot be incinerated.

Thus, there is a significant need in the art for a method to encapsulate and stabilize materials for safe interim on-site storage and transport to a disposal site that does not add excessive weight, that does not limit disposal options, that is an effective barrier to contain the hazard, that can be applied on-site at or near the ambient temperature, and that can lower the cost of remediating a hazard site.

BRIEF SUMMARY OF THE INVENTION

This invention relates to a method to encapsulate and stabilize materials for safe interim on-site storage and transport to a disposal site. The method of this invention uses closed-cell polymer foams that are applied by spray or pour methods. The operators can foam an object, a group of small items, loose material in an open container, or a free object prior to transport.

The invention solves the shortcomings of the prior art and provides a useful method needed in the art.

The encapsulation foam is a polymer foam that seals in chemical and biological agents on waste objects that are designated for removal from contamination sites. This polymeric barrier benefits the mitigation effort in three ways: First, it improves the safety of personnel by protecting them from both vapor/aerosol and contact hazards (mobile hazards). This in turn may allow personnel to operate with a lower level of Personal Protective Equipment (PPE), lowering heat stress and speeding the recovery operation by increasing the length of time that operators can work before overheating. Second, it can lower the transportation costs (and help prevent the spread of contamination) because the contaminants, or hazardous waste, are sealed within the substantially defect-free polymer barrier while they are being trucked away. Third, it can lower the cost of ultimate disposal in a landfill, or by incineration or gasification. Overall, this process can affect a dramatic savings in cost for both transportation and disposal, which together can account for a large fraction of the total remediation cost. The method can be used in ways that provide one or more of the above benefits.

The invention provides a method of encapsulating and safely transporting hazardous waste, the method comprising the steps of: first, providing a waste object at a first location; second, covering the waste object with a closed cell polymer foam; third, allowing a sufficient time for the closed cell polymer foam to cure; and forth, transporting the covered waste object to a second location. The second location may be a waste collection site or waste disposal site. This invention also provides a method comprising a fifth step of disposing the covered waste object by landfill. The covered waste object may be disposed of by incineration.

The hazardous waste may be a mobile hazard. Further, the closed cell polymer foam may be substantially impermeable to the mobile hazard. In one embodiment the method provides foam coating has a thickness from about 1 millimeter or more.

In another embodiment the method provides a closed cell polymer foam that is an expanding foam, where it expands after application and prior to, or during cure. In another embodiment the expanding foam is produced by a chemical reaction within the foam, wherein the chemical reaction causes expanding or the expanding foam is produced by addition of a compressed gas or refrigerant to the polymer foam during the second step. In a preferred embodiment the closed cell polymer foam expands during the second step and forms a substantially defect-free barrier around the waste object.

In another embodiment the second and the third steps occur at a temperature from 0 to 40 degrees Celsius or at the ambient temperature of the first location.

The dosed cell polymer foam may be the product of a chemical reaction between at least one isocyanate and at least one hardener selected from the group consisting of alcohols, polyols, amines and polyamines, or the dosed cell polymer foam may be the product of a chemical reaction between at least one isocyanate and water. In a preferred embodiment the dosed cell polymer foam is a polyurethane.

In an embodiment the second step further comprises covering the waste object by either spray application or by pour application of the closed cell polymer foam. And in a preferred embodiment the second step comprises covering the waste object by pour application.

In yet another embodiment the third step further comprises a polymer foam curing step that occurs in less than one hour, more preferably in less than 5 minutes.

In another embodiment this invention provides a method of encapsulating and safely transporting hazardous waste, the method comprising the steps of: first, providing a waste object at a first location; second, treating the waste object to decontaminate or neutralize the hazardous waste; third, covering the waste object with a closed cell polymer foam; fourth, allowing a sufficient time for the closed cell polymer foam to cure; and fifth, transporting the covered waste object to a second location. In an additional embodiment the waste object that has been treated to decontaminate or neutralize the hazardous waste further contains liquid, gaseous or reactive residue from the treating step. In a preferred embodiment the foam coating has a thickness from about 1 millimeter to 10 centimeters. And in another embodiment the foam coating has a thickness from about 1 centimeter to 1 meter. Optionally, the expanding foam may be produced by combining a refrigerant or compressed gas with the precursor to the polymer foam

DETAILED DESCRIPTION OF THE INVENTION

Figure 1:
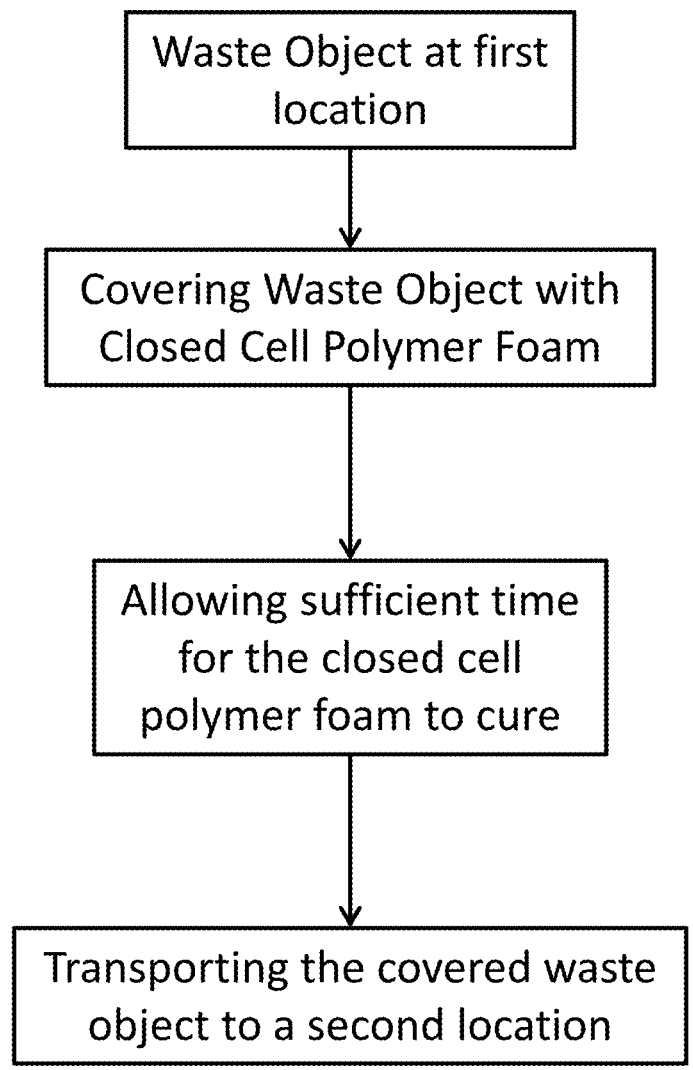
FIG. 1. Flowchart of the general steps in the encapsulation and transportation method.
Figure 2:
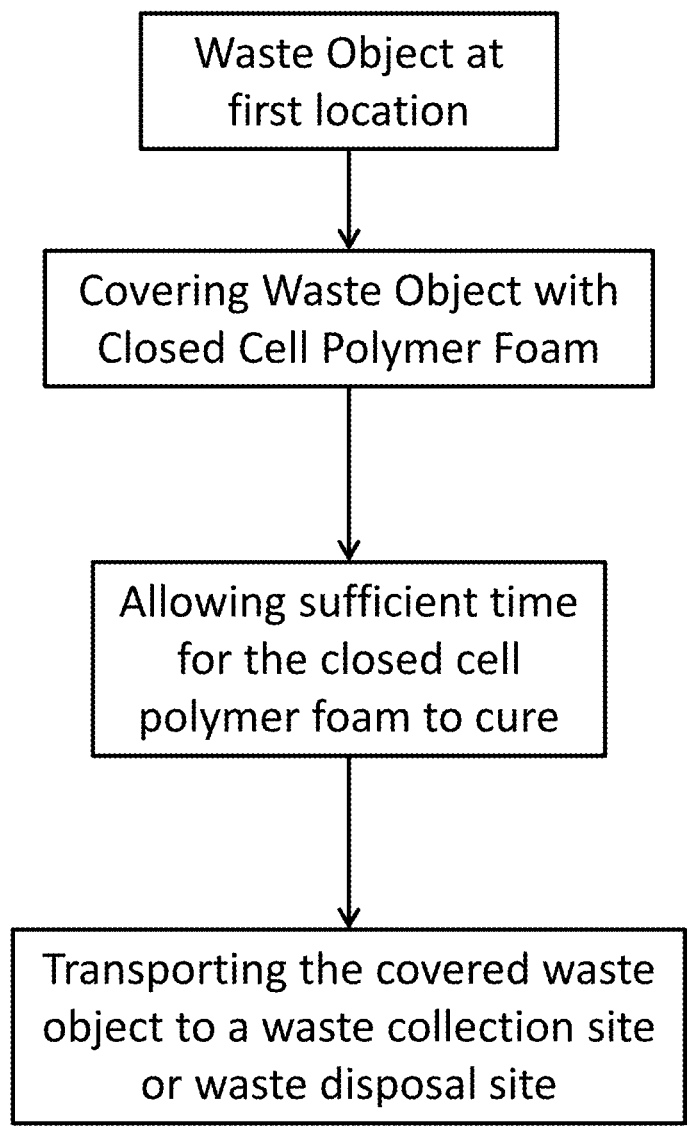
FIG. 2. Flowchart of the steps in the encapsulation and transportation to a disposal site.
Figure 3:
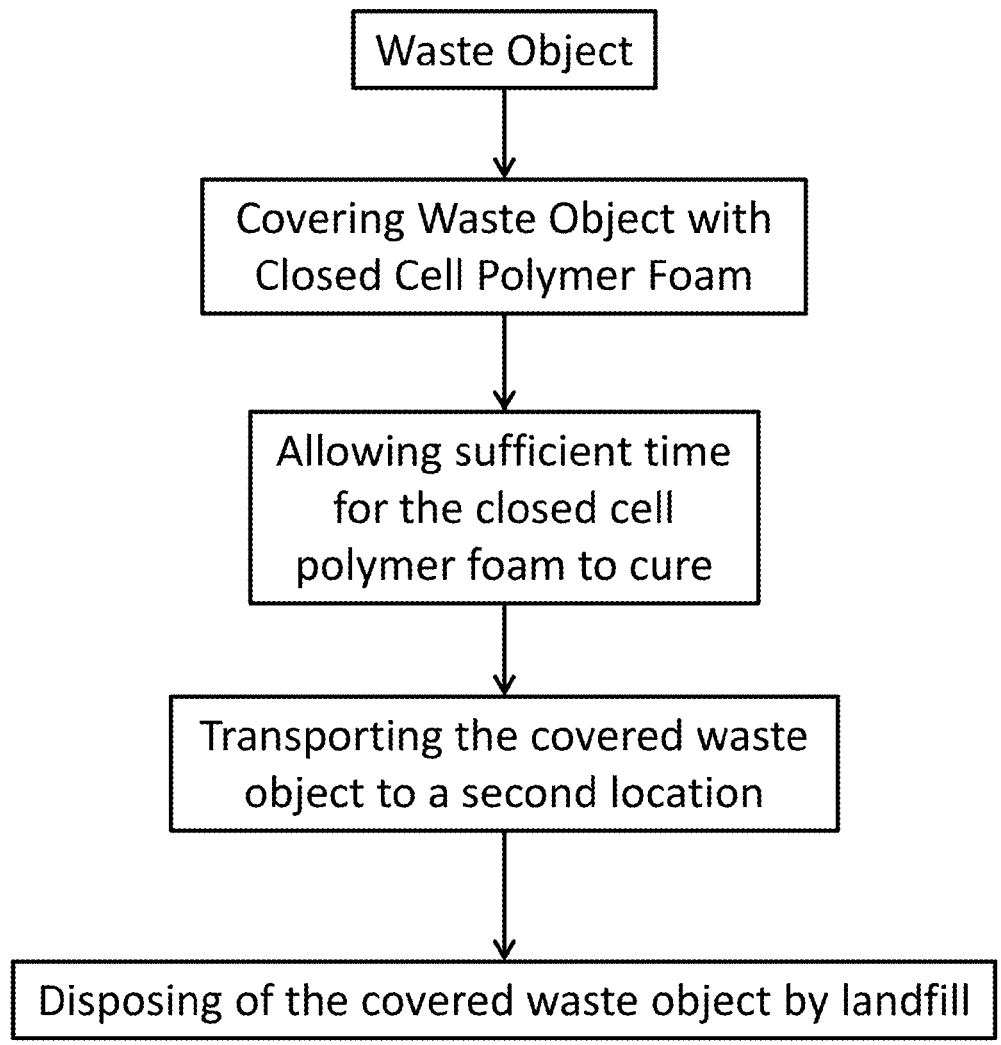
FIG. 3. Flowchart of the steps in the encapsulation, transportation and landfill.
Figure 4:
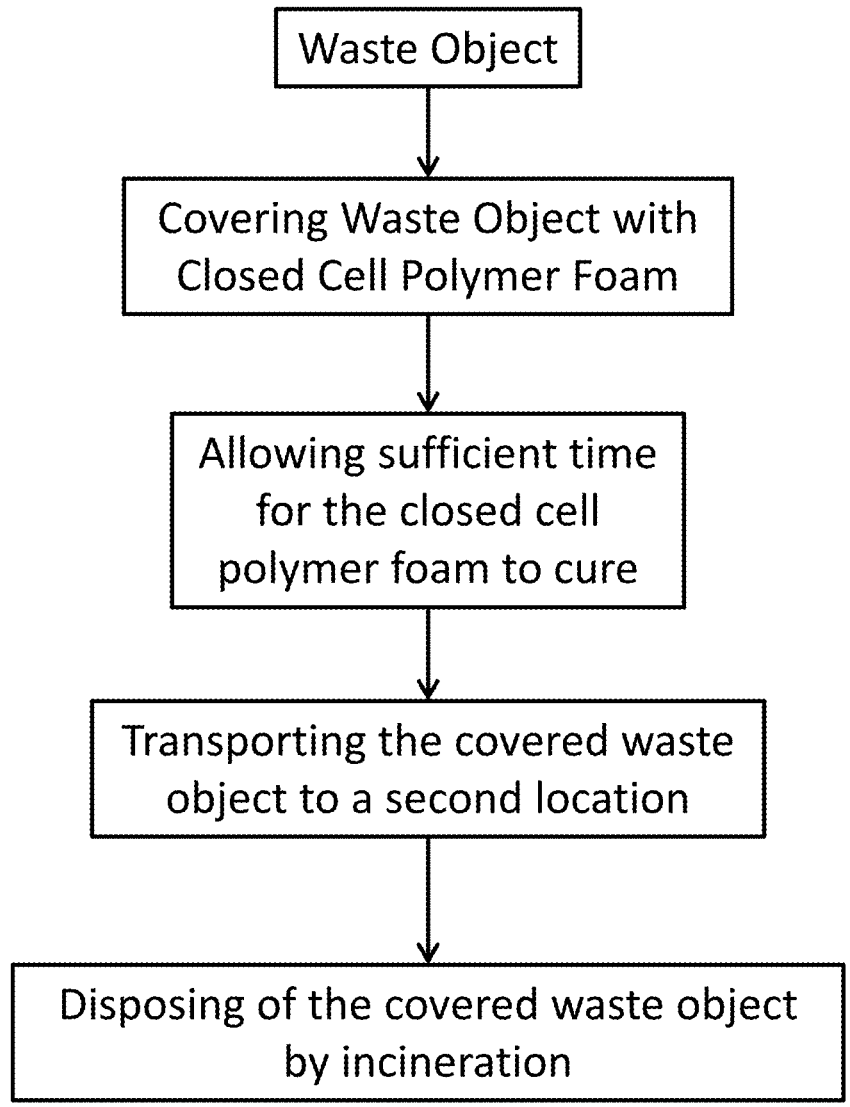
FIG. 4. Flowchart of the steps in the encapsulation, transportation and incineration.
Figure 5:
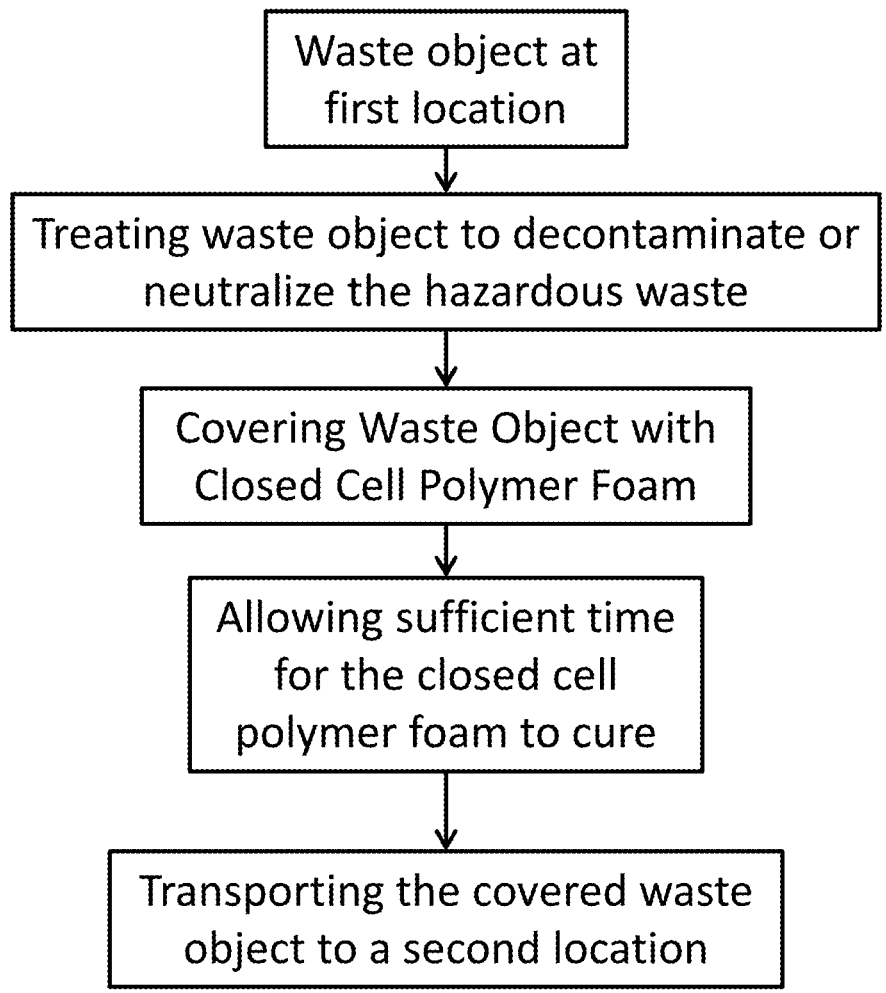
FIG. 5. Flowchart of the general steps in the treatment, encapsulation and transportation method.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

Waste object means a material or item which has no use or value, or which is no longer suitable or desirable for its intended purpose.

Hazardous waste means a waste object which is dangerous or potentially harmful to human health or the environment. In the context of the present invention, hazardous wastes can be solids, powders, solids with a liquid component (such as solid items that have become wet or have been treated with a liquid decontaminant), or sludges.

Mobile hazard means a dangerous or threatening substance that can be spread from one site to another. Examples of spreading mechanisms include by vapor or aerosol that is transmitted through the air, by liquid that moves from one site to another, by a liquid or solid that sticks to a second surface (for example a hand) after contact with the first site, or by particulate solid that is moved by air currents. That is, the mobile hazard may be a volatile, a spreadable, a transferable or a dispersible chemical or biological hazard.

Implied mobile hazard means it is unknown if mobile hazard is present at a specific site, but a mobile hazard is known or suspected to exist at a site in proximity to the implied mobile hazard. For example, a particular object has been in proximity to an item believed to be contaminated with a mobile hazard, and the object may be assumed to be also contaminated unless it is proven not to be contaminated through time-consuming and expensive texts. Thus the object is implied to be contaminated. An object or a surface will have an implied mobile hazard when it will be treated as having a mobile hazard, require handling, isolation or disposal as if it contained a mobile hazard, even when it does not.

For example, a chemical warfare agent, or a substance contaminated with a chemical warfare agent, constitutes a mobile hazard because any material that has been in proximity to said chemical warfare agent, or to an object contaminated with a chemical warfare agent, will often be implied to be contaminated. It is an objective of the present invention to provide an encapsulating barrier for a material that is implied to be contaminated (an implied mobile hazard), so that the material may be more readily stored, transported and disposed of. The advantage provided by this invention extends beyond the readily measurable encapsulating properties to the advantage of making a material less threatening to area residents and the general public by providing a visible, tangible barrier between the hazard and the surroundings.

A refrigerant means a material that is a gas at ambient temperature and pressure, but which can be liquefied at moderate pressure. Non-limiting examples of commercially available refrigerants include R-11, R-12, R-113, R-141, R-22, HFC134a, or the like. The preceding commercial refrigerants are known by other names, for example R-11 is trichlorofluoromethane, freon-11, CFC-11, or CAS#75-69-4. R-12 is dichlorodifluoromethane (R-12), Freon-12, also CAS#75-71-8. R-113 is 1,1,1-Trichlorotrifluoroethane, CFC-113, Freon 113, Genetron 113, Forane 113 or CAS#354-58-5. R-141 is 1,1-Dichloro-1-fluoroethane, HCFC-141b or CAS#1717-00-6. R-22 is chlorodifluoromethane or difluoromonochloromethane and is a hydrochlorofluorocarbon (HCFC). This colorless gas is better known as HCFC-22, R-22 or CAS#75-45-6. HFC134a is 1,1,1,2-tetrafluoroethane, R-134a, Forane 134a, Genetron 134a, Florasol 134a, Suva 134a or HFC-134a, or CAS#811-97-2.

The refrigerant may be packaged under pressure with the precursors to the closed cell foam. When the foam precursor is applied to an object or surface, the lowered pressure results in an expansion as the liquid turns to gas, producing an expanded foam structure. Such refrigerants are also referred to as blowing agents.

An embodiment of the present invention is a method using an encapsulating foam to retain hazardous materials by providing a substantially defect-free barrier. A closed cell polymer foam may have numerous holes, small passages or other features which, taken individually, would allow the passage of a gas or liquid and therefore constitute a defect. However, in the closed cell polymer foam of this invention, the presence of multiple closed cells in contact with each other produces a system that provides a substantially defect-free barrier.

A substantially defect free barrier means a barrier with essentially no effective continuous pathway from the surface of the encapsulated item to the outer surface that allow contamination to escape. Although individual holes, pores or localized defects may be present, the coating is thick enough to form a virtually impenetrable barrier, wherein impenetrable refers to the mobile hazard.

Based on observation of the localized defects in a closed-cell foam it is non-obvious that these foams could form a substantially defect free barrier; surprisingly, however, we have found that this system does provide an effective barrier, for example to chemical warfare agent simulants (See example A). The closed cell polymer foam provides substantially no continuous pathway from the surface of the encapsulated item to the outer surface that allows contamination to escape.

Waste collection site means a building, place or location where wastes are collected prior to further treatment or disposal. Said wastes may be disposed on or near the waste collection site (for example, the waste collection site may be at an incinerator or landfill), or may be subsequently transported to one or more other locations for further treatment or disposal.

Isocyanate means a compound containing at least one isocyanate functional group. Non-limiting examples of isocyanate compounds include isophorone diisocyanate, hexamethylene diisocyanate, 1,4-phenylene diisocyanate, 1,3-phenylene diisocyanate, m-xylylene diisocyanate, tolylene-2,4-diisocyanate, tolylene-2,6-diisocyanate, toluene 2,4-diisocyanate, poly(hexamethylene diisocyanate), trans-1,4-cyclohexylene diisocyanate, 3,3'-dimethoxy-4,4'-biphenylene diisocyanate, octamethylene diisocyanate, 4-chloro-6-methyl-1,3-phenylene diisocyanate, poly(tetrafluoroethylene oxide-co-difluoromethylene oxide) α,ω-diisocyanate, 1,4-diisocyanatobutane, 2,6-toluene diisocyanate, 2-methyl-m-phenylene diisocyanate, 1,3-bis(1-isocyanato-1-methylethyl)benzene, 3,3'-dimethyldiphenylmathane-4,4'-diisocyanate, 3,3'-dimethyl-4,4'-biphenylene diisocyanate, 4,4'-MDI 4,4'-methylenebis (phenyl isocyanate), 4,4'-methylenebis(phenyl isocyanate), methylene di-p-phenyl diisocyanate. Other isocyanate compounds may be substituted and these alternative compounds are understood by a Person Having Ordinary Skill in the Art.

Hardener means a compound the reacts with an isocyanate to form a polymer and may be an alcohol, diol, polyol, amine or polyamine. Alcohols contain a single R—OH functional group. Non-limiting examples of diols include ethylene glycol; 1,4-butanediol and 1,6-hexanediol. Amine hardeners include ethanolamine; amino-ethylethanolamine; methylimino-bis(propyl)amine; imino-bis(propyl)amine; bis (aminopropyl)piperazine: aminoethylpiperazine; polyoxyalkyleneamines and bis-(p-aminocyclohexyl)methane. Non-limiting examples of polyols include diols such as ethylene glycol, propylene glycol, diethylene glycol, dipropylene glycol, 1,4-butanediol and 1,6-hexamethylene glycol, triols, such as glycerol, trimethylolpropane, butanetriols, hexanetriols, trimethylolphenol, novolacs, trialkanolamines; various tetrols, such as erythritol and pentaerythritol; pentols; hexyls, such as dipentaerythritol and sorbitol, and sucrose; carbohydrates; polyhydroxy fatty acid esters, such as castor oil. Polyamines include, for example, ethanolamine, diethanolamine, triethanolamine, isopropanolamine, diisopropanoiamine, triisopropanolamine, 2-(2-aminoethylamino) ethanol, 2-amino-2-(hydroxymethyl)-1,3-propanediol, N-methyl- and N-ethyl-diethanolamine and triethanolamine; hydrazines; N-monoalkyl-, N,N- and N,N'-dialkyl-substituted diamines with 1 to 4 carbon atoms in the alkyl radical such as an aminoalkyl piperazine like aminoethyl piperazine; mono- and dialkyl-substituted ethylenediamines; 1,2- or 1,3-propylenediamine; 1,4-butylenediamine; 1,6-hexamethylenediamine; and 4,4'-, 2,4'- and 2,2'-diaminodiphenylmethane; diethylenetriamine, triethylenetetraamine, urea and urea-formaldehyde polymers, as well as various aryl polyamines, such as 4,4',4"-methylidenetrianiline. Other alcohol, diol, polyol, amine, or multi-amine compounds may be substituted and these alternative compounds are understood by a Person Having Ordinary Skill in the Art.

Alternatively Isocyanates can react with atmospheric water to cure. A commercial example of such a material is DOW Great Stuff, a foam that is cured by moisture in the air.

Another embodiment of the present invention is providing a treatment for materials that have been treated to decontaminate or neutralize the threat. For example, an item contaminated with a chemical or biological threat may be treated with a liquid bleach solution to neutralize the threat. The treated item may contain remaining liquid bleach solution. The present invention enables encapsulation of such treated items so that, even in the presence of a reactive liquid such as bleach, the threat remains contained.

In one embodiment of this method, spray-applied foams (including building insulation foams) are used to encapsulate contaminated materials for safe transport. Closed-cell polymer foams can be applied at varying thicknesses.

Building insulation foams are applied using a spray system, commonly a component A and B are mixed at the spray nozzle and applied onto the surface. The two components can either be (1) injected with air during application to produce a foam, or (2) the reaction between the two components produces carbon dioxide, which creates a foam. As the foam is formed and the polymeric mixture expands it moves into cracks and crevasses to completely fill any open areas. Thus, the foaming mechanism is used to fully encapsulate odd shaped materials.

There are a number of chemically distinct commercially available polymer foams on the market, all available in large quantities. In one embodiment the rigid foam is a polyurethane. The foam can be generated in what are commonly known as closed-cell or open-cell foams. The difference between the two is basically how the bubbles interact or don't interact within the foam. Closed-cell foams have small isolated bubbles making up the foam; the closed-cell foam is typically denser, rigid and does not permeate air or water vapor. Open-cell foam has larger bubbles that interact and contact each other forming channels within the foam. This produces less dense foam and some pathways travel all the way through the foam, allowing for air and water vapor to migrate through the thickness of the foam. Surfactants within the starting mixture control how the bubbles interact and determine if the final foam product will be closed or open-cell. All of these products are applied in a thin film, as they react they release carbon dioxide ($CO_2$) or are injected with air or other gasses during application to form the air bubbles that make up the foam. The present invention uses closed cell polymer foams.

Polyurethane is formed by combining two different chemical components; one contains two or more groups of isocyanate functional groups (R—N═C═O) and the second part contains two or more hydroxyl functional groups (R'—OH).

The hydroxyl and isocyanate groups react to combine a urethane linkage R—(NHCOO)—R'. Polyurethane is combustible and will ignite if exposed to an open flame. In the case of moisture cured polyurethanes, water reacts with the isocyanate groups and the combine to form urethane linkages. A detailed discussion of polyurethanes is found in *Ullman's Encyclopedia of Industrial Chemistry*, Vol. 49, page 545-604, Wiley-VCH 2012, and is incorporated by reference herein.

In another embodiment, closed-cell polyurethane foam materials provide a rigid, non-permeable encapsulation coating that retains toxic contaminants without releasing them to the environment; in addition the foam can be incinerated along with its contents to completely destroy any chemical or biological warfare agents held within the encapsulations.

At the site of remediation essentially any sized item can be encapsulated. Once the polymer foam has hardened, it locks in the contaminants, allowing them to be transported and disposed of as a non-hazardous waste. Upon completion of the transport of the encapsulated item it can be placed in an approved land fill or combusted in a permanent municipal waste incinerator. Spore contaminated waste disposal in landfills has the added concern of potential spore re-release through landfill gas (McBrian Tufts, J. & Rosati, J., 2012. Thermal inactivation of *Bacillus anthracis* surrogate spores in a bench-scale enclosed landfill gas flare. *Journal of the Air & Waste Management Association*, 62(2), pp. 151-159); hardened polymeric foam minimizes the risk of this potential long term problem. The hardened encapsulating polymer also provides assurance that an incinerator feed pit will not become contaminated during manipulation with mechanical equipment. In addition, the combustible nature of the polyurethane foam ensures that the incinerator does not have to break open the encapsulation but instead can simply burn the entire shipped item.

The invention is also applicable in other less toxic events, such as remediation of natural communicable diseases outbreaks in agriculture or livestock populations, toxic industrial chemicals (TICs) or toxic industrial materials (TIMs).

A particular advantage of the present invention is the ability to provide, in a single application at ambient temperature, a coating that has both the barrier properties to seal in the contamination and the mechanical properties to resist damage during handling. When applying common liquid coatings to surfaces, evaporation of the solvent (whether the solvent is water or an organic liquid) will tend to leave porosity in the resulting coating that compromises its barrier properties. Also, a liquid applied to a complex surface will flow into cracks in the surface and away from high points, leaving surfaces in or adjacent to cracks and adjacent to high points potentially unsealed. This effect can be minimized by application of multiple layers of coating, but that requires additional time and expense. For these reasons, surface coatings are widely used to protect the coated surfaces from contamination, but not used to seal in contamination. In contrast, a feature of the present invention is the property of the foam to expand, thereby filling cracks in the surfaces, and expanding around high points so that those are also covered. Furthermore, the foam produces a thicker barrier than common coatings (up to many inches in thickness), and a barrier which, when struck by an object, compresses on impact, dissipating the force of the blow and minimizing damage to the coating. In contrast, the much thinner standard coatings, under a similar impact, have no means to dissipate the energy of the impact and could readily be damaged, compromising the sealant properties of the coating.

Materials and items that can be encapsulated include, but are not limited to, concrete, drywall, carpet, acoustic ceiling tile, furniture, hardware, metal building materials, furniture, office materials, building insulation, wood structures and painted surfaces. There are a number of commercial products available that can be used as the foam encapsulant including, for example, Dow's Great Stuff product line, DAP Kwik foam polyurethane sealant, Red Devil Polyurethane triple expanding foam, Fomo products polyurethane sealant and Handi-foam quick cure polyurethane spray foams.

In one embodiment of this invention commercially available pour polyurethane foams (including building insulation foams) may be used to encapsulate contaminated materials, for example, materials contaminated by a chemical or biological attack or a disease outbreak. This invention can be used to encapsulate materials that can then be transported and disposed of with greater safety to personnel and with simplified regulatory requirements, thus greatly reducing the time and cost of remediation.

The act of remediating chemical/biological release areas, be it in a building or on a larger scale, can produce wastes from porous building materials and furnishings, office equipment, contaminated HVAC systems, outdoor materials, and construction and demolition debris. A challenge is finding an appropriate sized containment vessel for these diverse materials. Polymer foam can be applied to items of any desired size; you could encapsulate an entire chair, desk, or bundle of carpet or a large box or dumpster filled with debris. The expanding foam ensures that the entire surface becomes covered, fully enclosing the contaminated materials. Upon drying, the polymeric foam hardens and further reduces the risk of contamination spread as could easily happen if these materials, for instance, are simply bagged in plastic bags, which are readily torn.

The broad commercial applications of polyurethane foams means that equipment and materials will be available anywhere needed in the United States. For example, spray polyurethane foam installer training and certification courses are available (more below); however there is no requirement that an installer be certified before spraying. Training is more like an industry credential. The Air Barrier Association of America (ABAA) offers a 3 day certification course, with both theory and practical instruction. Certification requires passing written exams followed by 3000 hours of experience in air barrier applications or related fields. TDA is not aware of any pour foam training courses or certifications.

At the site of remediation, any sized item can be encapsulated. Examples of potential uses for spray foams include the encapsulation of large non-uniforms sized items such as large rolls of carpet, furniture or other items that are time consuming or undesirable to breakdown. These larger items could simply be sprayed with polyurethane foam which would then expand and harden, fully encapsulating the item. For smaller items, spray foam may not be the ideal solution as the large number of items could be time consuming to individually process. This highlights examples for the potential uses for pour foams. Large cardboard boxes are readily available; a standard size is 48×40×40 inches in size (4 ft×3.33 ft×3.33 ft, volume ~44.4 ft$^3$). These boxes can be placed on a wooden pallet for ease of transport. An initial pour foam layer can be placed on the bottom of the cardboard box to act as the underside of the encapsulation. Then numerous contaminated items are placed in the box, on the base foam, while simultaneously adding additional pour foam to encapsulate these materials. When complete, a large number of smaller contaminated items would have been encapsulated into a uniform box size unit that can be easily handled with a forklift and shipped to any desired location. Both spray and pour foams have their potential uses, and both would probably be used be utilized during a large scale remediation.

Once the pour polymer foam has hardened, it will lock in the contaminants, allowing the items to be transported and disposed of as non-hazardous waste. Upon completion of the transport of the encapsulated item it can be placed in an approved landfill or combusted in a permanent municipal waste incinerator. Spore-contaminated waste disposal in landfills has the added concern of potential spore re-release through landfill gas (McBrian Tufts & Rosati, 2012); hardened polymeric foam will minimize the risk of this potential long term problem. The hardened encapsulating polymer will also provide assurance that an incinerator feed pit will not become contaminated during manipulation with mechanical equipment as will happen with plastic bagged wastes. In addition, the combustible nature of the polyurethane foam ensures that the incinerator does not have to break open the encapsulation but instead can simply burn the entire shipped item. By not having to break into the encapsulation material (as would be needed with concrete) to treat the contaminated material, this confirms that once the contaminated items are enclosed in protective foam at the site of remediation, there is minimal risk once it leaves the site. This ensures that only the active remediation site is contaminated and other locations do not subsequently have to be cleaned due to spread of the toxins.

This proposed polymeric pour foam encapsulation invention is primarily focused on CBRN contaminants; however the technology could also be applicable in other less toxic events, such as remediation of natural communicable diseases outbreaks in agriculture or livestock populations, toxic industrial chemicals (TICs), toxic industrial materials (TIMs) or residual contaminants from decontamination such as Arsenic from lewisite, neutralized break down products or materials contaminated with reactive decontaminants.

Pour foams are identified by the density of the cured foam, typically two to eight pounds per cubic foot. For example, a two pound foam expands more and generates a less dense final product than an 8 pound foam. Pour foams are available as two-component liquids; on mixing the liquid expands to a foam through release of $CO_2$ and then solidifies. Pour foams are available in densities from 2 to 8 lbs/cubic foot (32 to 128 $kg/m^3$).

EXAMPLE 1

Containment of an Indicator Dye

The effectiveness of this invention has been measured by demonstrating performance that lowers the threat, and therefore the category that describes the waste. Tests demonstrated that the foam forms a continuous, mechanically robust barrier over irregular objects that can contain the vapor of a volatile liquid contaminant and prevent the leaching of a water-soluble contaminant.

Toxicity characteristic leaching procedure (TCLP) testing was performed to help establish if the encapsulated waste requires a hazardous waste code. Samples of ceiling tile were saturated with a water-soluble red dye (chlorophenol red sodium salt) and then encapsulated with pour foam. We tested encapsulated materials using a modified TCLP Method 1311. At the end of the 3-week test period, spectrophotometric analysis detected no dye in any of the extraction solutions. In contrast, the positive control sample (with no foam barrier) released the dye and turned the solution red. This test demonstrated that no release of the encapsulated material was observed upon extended immersion in either acidic or neutral water.

EXAMPLE 2

Containment of a Chemical Warfare Agent Simulant

In a second set of experiments, carpet, drywall and ceiling tile samples were contaminated with methyl salicylate (MeS), a simulant for the CW agent mustard (HD), and then encapsulated with both pour and spray foams. A permeation chamber was constructed to quantify the amount of simulant escaping from an encapsulated sample. Control experiments were performed to establish the amount of simulant captured in a carbon sorption tube, the extraction efficiency from the carbon in the sorption tube, and the recoverable amount from non-encapsulated samples in the permeation chamber. Results showed that >99.92% of the MeS simulant was contained in the encapsulating polyurethane foam (no simulant was detected).

EXAMPLE 3

Demonstrating Cost Reduction

This invention disclosure demonstrates the feasibility of using polyurethane polymer pour foams to encapsulate building materials that are contaminated with a chemical warfare agent simulant. Encapsulation can protect waste treatment personnel and prevent spreading of contamination. It can also dramatically lower the cost of transport and disposal by converting a regulated hazardous waste to a non-hazardous material. For example, the cost of disposing of a 20-yard dumpster filled with contaminated material (20,000 pounds) is $44,100. Foam to encapsulate that quantity of material costs $1,001; the cost of disposing of the resulting non-hazardous waste is $2,386. The net savings is $40,713.

EXAMPLE 4

Laboratory Demonstration of a Procedure to Encapsulate a Ceiling Tile Sample

In this test we optionally poured a bottom layer and allowed it to harden, then placed the ceiling tile on the foam and poured additional foam over the sample. In an alternative approach we utilized a single pour of the foam to encapsulate a ceiling tile sample.

EXAMPLE 5

Modified TCLP Testing

Tests to demonstrate this encapsulation technology used a modified Toxic Characteristic Leaching Procedure (TCLP Method 1311) and is incorporated herein by reference. During these series of experiments we took small ceiling tiles and cut them into half inch cubes weighing approximately 1-2 grams. We saturated the ceiling tile with a water-soluble red dye (chlorophenol red sodium salt—Aldrich) that was deposited from an aqueous solution and allowed to dry on the ceiling tile cube. Upon drying, the tile samples were encapsulated in polymer foam. Multiple encapsulated samples were prepared, including a non-encapsulated sample to work as a positive control. Each of these samples was submerged in 500 mL of extraction fluid. The test solutions used for this initial test included 4 tap water replicates and an acidic 2M HCl solution. The samples remained submerged for 3 weeks. The extraction solutions were then analyzed with UV-Vis to determine if any dye had been leached from the encapsulated sample.

Figure 6:
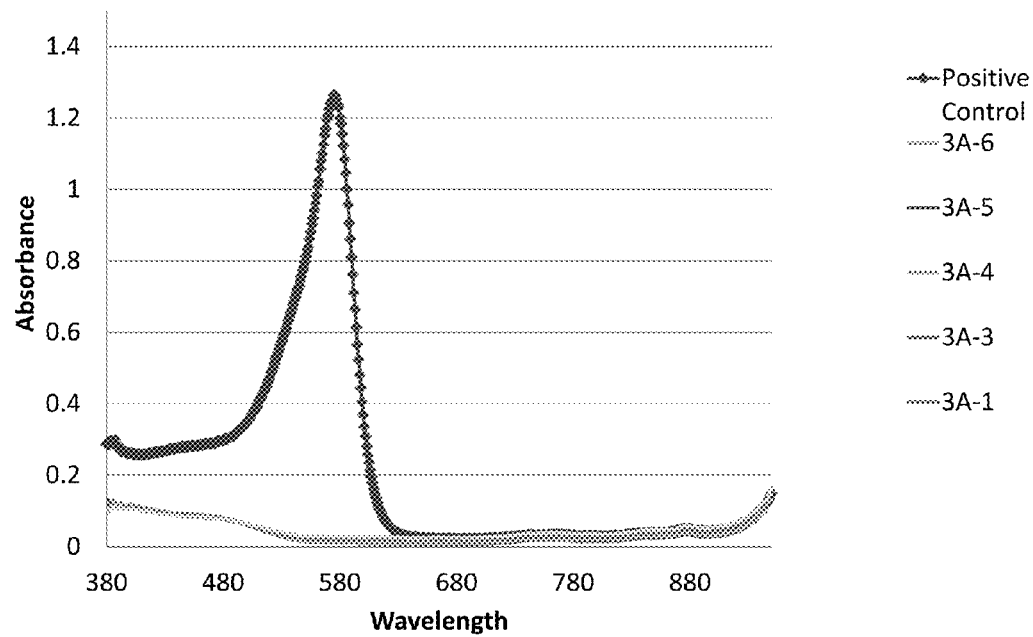
FIG. 6. UV-Vis spectroscopy of the release of red dye after 3 weeks of immersion.

At the end of the 3 week testing period, analysis measurements showed no dye was present in any of the extraction solutions, with the exception of the positive control sample which, as designed, released the dye and turned the solution red. During this test, we demonstrated that no release of the encapsulated material was observed upon extended immersion in acidic and neutral water. Even the strong acid, 2M HCl, has no effect on the foam. (FIG. 6).

EXAMPLE 6

Permeation Testing Control and Quantification Methods

During this series of tests we completed our control experiments with the vapor permeation chamber. The permeation chamber is designed so that air (breathing air from a cylinder of compressed gas) flows into the chamber containing the encapsulated sample, around the sample, and then exits through an SKC Anasorb Coconut Shell Carbon sorption tube to capture any off-gassing vapors. Thus, if any chemical warfare agent simulant escapes the encapsulating foam, it will be collected on the carbon sorption tube. The chemical warfare agent simulant that has been selected is methyl salicylate (MeS), a surrogate that replicates the relevant physical properties (including vapor pressure at ambient temperature), of agent HD (HD: vapor pressure 0.072 mmHg at 20 C, boiling point 227.8 C; MeS: vapor pressure 0.11 mmHg at 25 C, boiling point 222 C).

For analysis, MeS simulant is extracted from the SKC Anasorb carbon sorption tubes using a chloroform solution containing an internal standard of 500 ppm hexadecane. Testing was performed to show that the hexadecane was not adsorbed onto the SKC Anasorb carbon during extraction; both the before and after extraction concentrations of hexadecane were matched as measured by GC/MS. A solution of chloroform with a fixed amount of hexadecane internal standard was prepared; a small aliquot (~6 g) of this solution is used for each of the extractions of MeS simulant from the SKC Anasorb sorption tube (carbon mass in tube is ~0.16 g).

Figure 8:
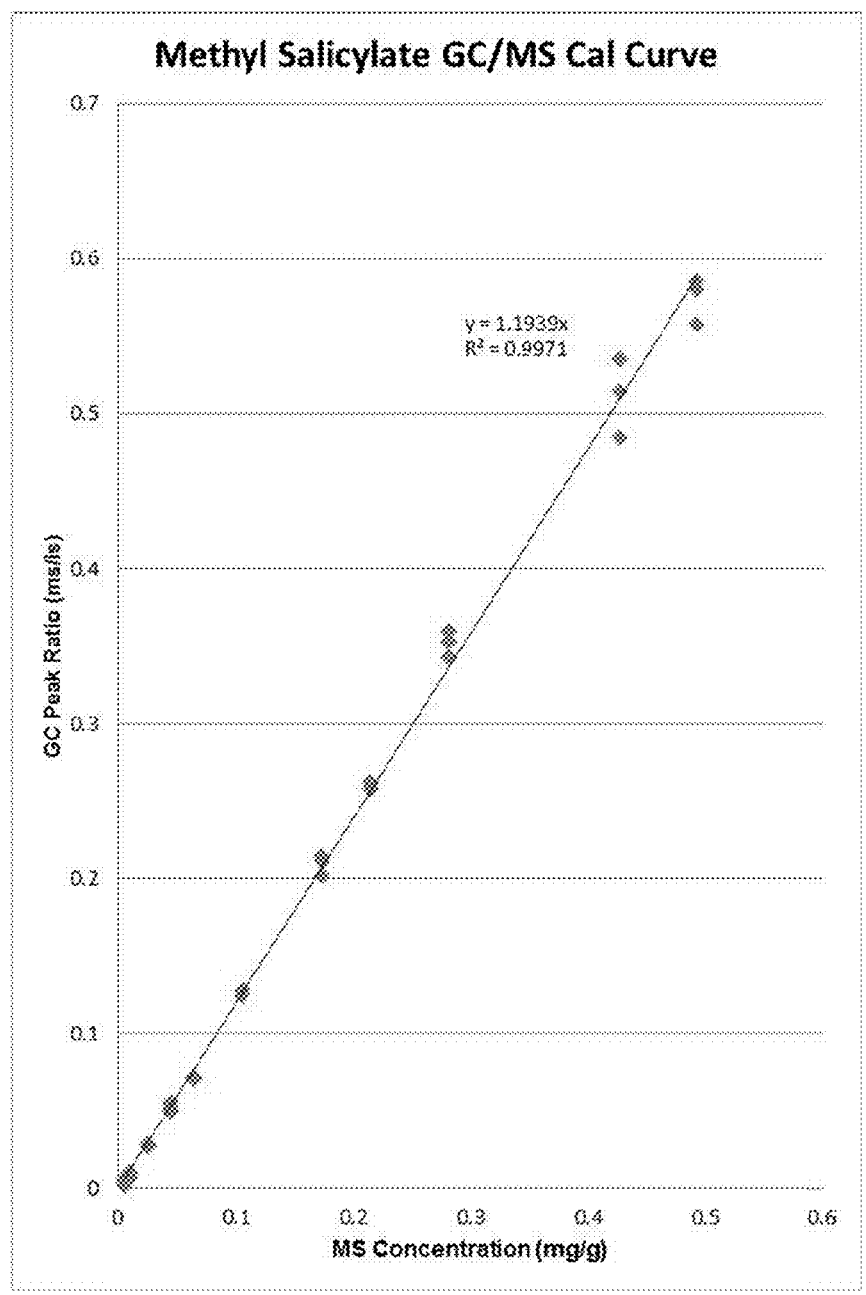
FIG. 8. GC/MS calibration curve for methyl salicylate.

A calibration curve for MeS as measured by GC/MS was determined using the peak ratio of the MeS peak area to the internal standard peak area as a function of the starting MeS solution concentration in milligrams of MeS to grams of chloroform. This gives a calibration curve that is very robust and can account for any injection volume discrepancies or instrumental issues that may arise during the experimental testing time. The calibration plot is very linear and allows for accurate quantification of the simulant MeS. The calibration curve is shown in FIG. 8; a plot of the four lowest MeS concentration calibration points give an estimated limit of detection of 0.0031 mg/g MeS as determined by the point at which the y-axis equals zero on the calibration curve.

Figure 7:
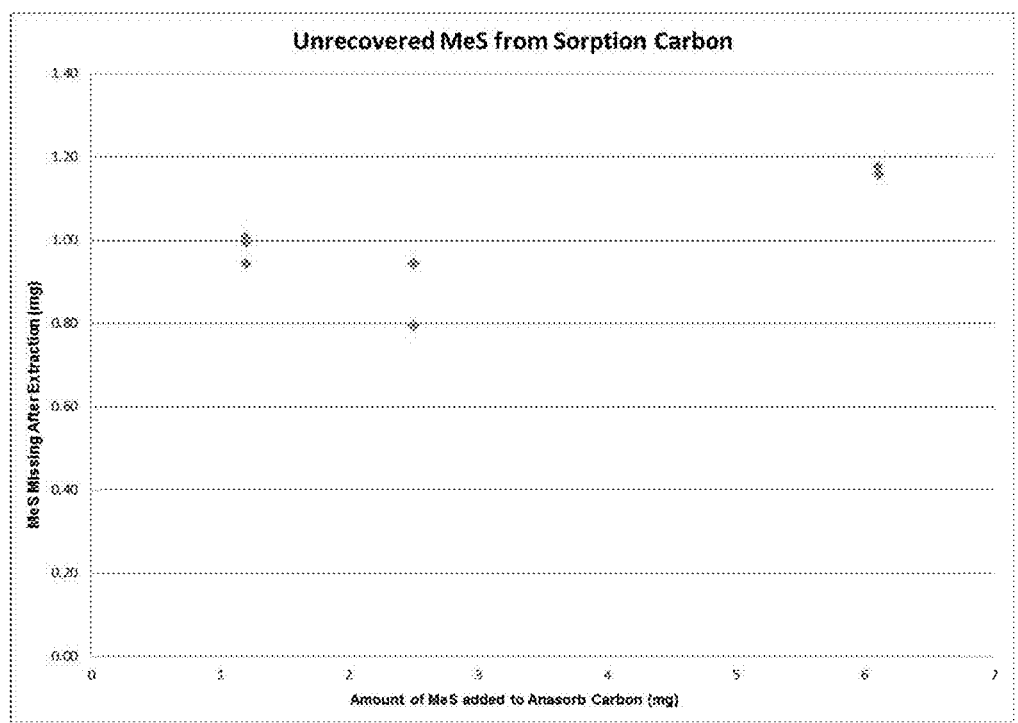
FIG. 7. Extraction efficiency: amount of unrecovered Methyl Salicylate as a function of amount added. Approximately 1 mg could not be recovered, independent of dosing level.

Further, extraction efficiencies of the MeS from the Anasorb carbon have also been measured. Differing amounts of MeS were placed on a fixed amount of the sorption carbon, the MeS was extracted and quantified to determine our ability to remove the MeS from the carbon and quantify it. Our extraction procedures remove all but a small, constant fraction of the MeS from the carbon. For each sample ~0.16 grams of carbon was used with 1 to 6 mg of MeS. The amount of MeS recovered was about 1 mg less than what was added for each MeS concentration level tested. A graph showing the mass of unrecovered MeS as a function of the amount of MeS added to the carbon is shown in FIG. 7.

A recovery efficiency control test was performed using the permeation chamber. For this experiment a clean, dry ceiling tile sample was contaminated with 6% MeS contamination by mass (1.683 g ceiling tile with 100.9 mg of MeS). The MeS was allowed to adsorb into the ceiling tile for 2 hours before placing the sample into the permeation chamber without further treatment or encapsulation. During this aging process the sample is stored in a glass petri dish to minimize the amount of MeS that evaporates from the sample. In the permeation chamber compressed breathing air flowed at approximately 1.5 L/min over the sample and through an SKC Anasorb sorption tube to collect any MeS that vaporizes from the ceiling tile. The sample was run in the permeation chamber for 94 continuous hours. The Anasorb carbon was then extracted with the chloroform solution described above and quantified using the GC/MS and calibration curve shown in FIG. 8. The amount of MeS recovered was 19.44+/−0.29 mg, this represents 19.27+/−0.29% of the original 100.9 mg placed on the ceiling tile sample. The relatively low recovery is expected as the permeation chamber is large compared to this sample since it is designed to handle foam encapsulated samples.

Based on these control experiments we can begin to establish conditions to test encapsulated samples that will allow us to quantify how well the encapsulation foam works to seal in hazardous chemical warfare agent vapors as determined using the MeS simulant. Based on our estimated detection limit of 0.0031 mg/g MeS and a chloroform extraction volume of 6 grams, this gives us the ability to detect 0.0149 mg of MeS. However, extraction of MeS from the sorption carbon causes a loss of approximately 1 mg of MeS, thus there needs to be at least 1.0149 mg of MeS in a sample for these methods to be able to detect it. Further, since our recovery of MeS from a sample in the permeation chamber is only about 19%, then 5.34 mg of MeS must be present to ensure we can detect it using these methods.

EXAMPLE 7

Permeation Testing

Initial permeation testing utilized two ceiling tile samples, which were contaminated, then encapsulated and evaluated in the permeation chamber. The two ceiling tile samples were contaminated with MeS, one with 4.78% and the other with 6.71% weight percent contamination. This represents 68.6 mg and 116.2 mg of MeS, respectfully. This is 12 to 18 times the amount of MeS that we have shown can be quantified using these analysis methods. One sample was encapsulated in two-pound pour foam and the second sample was encapsulated in four-pound pour foam (recall that the two-pound foam has a density of 2 lbs per cubic foot). Both samples were placed in the permeation chamber with compressed breathing air flowed over the sample for 4 days. At the end of the four days, the Anasorb sorption carbon was extracted and measured on the GC/MS to determine how much MeS had escaped from the encapsulated sample. No MeS was detected. Based on the limit of detection calculated above we cannot say conclusively that no MeS desorbed from the sample however it is less than 7.8% of the starting amount in the smaller sample and 4.6% in the larger sample. After these tests we moved on to experiments that were much more sensitive.

EXAMPLE 8

Contamination Level Scale Up and Permeation Chamber Testing

Our first experiment increased the amount of encapsulated MeS by taking a 1.67 g ceiling tile and contaminating it with 1.927 g of MeS (a 115% weight percent contamination loading). After allowing the MeS to completely soak into the ceiling tile for one hour, the sample was encapsulated in a two-pound pour foam, the least dense polyurethane (and therefore presumably the most permeable) pour foam that we have tested. The final volume of the encapsulated sample was approximately one liter. The sample was placed in the sealed permeation chamber and compressed breathing air was pushed over the sample, the exit point of the permeation chamber was passed through an Anasorb carbon trap (described above). After leaving the sample in the permeation chamber for 4 days, the Anasorb carbon was extracted and the amount of MeS captured on the sorption carbon quantified. A blank sample and the extracted sample were analyzed by GC/MS three times each and no MeS was measured or detected. This non-detect result and our 5.34 mg limit of detection indicate that at least 99.72% of the MeS remained contained within the polyurethane encapsulating foam.

EXAMPLE 9

Encapsulation of Multiple Building Materials

We further challenged this encapsulation technology by increasing the mass of materials, while also expanding the types of materials and their level of contamination. Using the same amount of two-pound pour foam as the experiment described above (to produce a final overall volume of approximately one litter) we encapsulated a 1.74 g carpet sample, 10.57 g dry wall sample and two ~2.10 g ceiling tile samples. Each of the samples was contaminated with a varying amount of MeS simulant with the total mass of 6.8123 g. This represents a 41% weight percent contamination loading. The MeS was allowed to dwell on these samples for one hour in a sealed container to prevent any loss of the MeS while allowing it to soak into the materials. The encapsulated material was placed in the permeation chamber for 4 days while collecting any emitted vapor with an Anasorb carbon sorption tube. The carbon sorption material was extracted and the amount of MeS was quantified with GC/MS. A very small GC peak was observed where the MeS GC was expected. The peak was assumed to be MeS and was quantified accordingly. Three separate GC samples were analyzed and the average amount of MeS detected was 0.000119 g. Based on the 5.34 mg limit of detection for MeS, we assume that approximately 0.00545 g of MeS could have escaped from encapsulated material. This result shows that 99.92% of the contaminating MeS was contained in the encapsulating polyurethane foam.

This test leads to several important conclusions. First, this encapsulation technology is capable of handling highly contaminated materials. The carpet sample and ceiling tile samples were 'soaked' with MeS, the ceiling tile had ~100% mass contamination ratio and the carpet was 60%. It is not expected that real world contaminated samples would be this highly contaminated, to the point where liquid agent remained. In that case a solid sorbent would likely be used to absorb the liquid, thus decreasing the contamination level of the materials. Second, this test shows that various building materials can be successfully encapsulated together. Further testing on additional materials is needed; however, these various materials show that the technology should work with any building materials that are contaminated and require disposal. Third, we have begun to establish the weight ratio of foam to contaminated materials. The materials, with a total weight of 23.32 g (including the MeS) were enclosed in a final volume of approximately one liter, which was accomplished using 60 ml of total starting foam materials. The ratio of encapsulating foam to contaminated mass is far from optimized and can certainly be improved;

EXAMPLE 10

Pour Foams

Pour foams are available in a greater range of densities (a greater variation of closed cell structure) than spray foams. Eight, four and two pound polyurethane foams are available as pour foam. The densest industrial spray foam currently available is 2.8 pounds, used to insulate manhole covers; a two pound product is typically used for building insulation. Pour foams do not require any specialized equipment, while industrial spray foams use large specialized equipment. Pour foam encapsulation use would have to be implemented differently than spray foams. An example would be using a large cardboard box form factor where pour foam is placed on the bottom then the contaminated item is placed in the box followed by additional pour foam to complete the encapsulation. Advantages of this uniform shape include a standard shipping size, ease of stacking and storage.

To demonstrate how pour foams can be used to encapsulate materials, the following figures show the step by step process. The initial materials needed are a vessel to contain the materials to be foam encapsulated, the contaminated items to be foamed and the pour foam product.

An initial foam layer is mixed and added to the encapsulating vessel. The foam is allowed to expand and then become firm but is not completely cured. This forms the bottom portion of the encapsulation. Once the base foam layer has been prepared, and before it has completely cured, other items for encapsulation are introduced. For this demonstration a piece of drywall, carpet, glass and metal washer and bolt were encapsulated. A second layer of foam was then added to complete the encapsulation process.

Within 20 minutes of beginning the initial mixing process the items are encapsulated. The polyurethane foam cures for a short period and hardens. Curing takes place quickly and in this example, the encapsulating foam is removed from the vessel to demonstrate the process.

What is claimed is:

1. A method of encapsulating and safely transporting wet chemical warfare agent hazardous waste, the method comprising the steps of: first, providing a wet chemical warfare agent waste object at a first location; second, covering the wet chemical warfare agent waste object with a closed cell polymer foam; third, allowing a sufficient time for the closed cell polymer foam to cure; and fourth, transporting the covered wet chemical warfare agent waste object to a second location.

2. The method of claim 1, wherein the second location is a waste collection site or a waste disposal site.

3. The method of claim 2, further comprising a fifth step of disposing the covered wet chemical warfare agent waste object by landfill.

4. The method of claim 2, further comprising a fifth step of disposing the covered wet chemical warfare agent waste object by incineration.

5. The method of claim 1, wherein the wet chemical warfare agent hazardous waste comprises a mobile hazard.

6. The method of claim 5, wherein the closed cell polymer foam is substantially impermeable to the mobile hazard.

7. The method of claim 1, wherein the foam coating has a thickness of at least 1 millimeter.

8. The method of claim 1, wherein the closed cell polymer foam is an expanding foam.

9. The method of claim 8, wherein the expanding foam is produced by a chemical reaction within the foam, wherein the chemical reaction causes expanding.

10. The method of claim 8, wherein the expanding foam is produced by addition of a compressed gas or refrigerant to the polymer foam during the second step.

11. The method of claim 1, wherein the closed cell polymer foam expands during the second step and forms a substantially defect-free barrier around the waste object.

12. The method of claim 1, wherein the second and the third steps occur at a temperature from 0 to 40 degrees Celsius.

13. The method of claim 12, wherein the second and the third steps occur at the ambient temperature of the first location.

14. The method of claim 1, wherein the closed cell polymer foam is the product of a chemical reaction between at least one isocyanate and at least one hardener selected from the group consisting of alcohols, polyols, amines and polyamines.

15. The method of claim 1, wherein the closed cell polymer foam is the product of a chemical reaction between at least one isocyanate and water.

16. The method of claim 1, wherein the closed cell polymer foam is a polyurethane.

17. The method of claim 1, wherein the second step further comprises covering the wet chemical warfare agent waste object by spray application of the closed cell polymer foam.

18. The method of claim 1, wherein the second step further comprises covering the wet chemical warfare agent waste object by pour application.

19. The method of claim 1, wherein the third step further comprises a polymer foam curing step that occurs in less than one hour.

20. The method of claim 1, wherein the third step further comprises a polymer foam curing step that occurs in less than 5 minutes.

21. The method of claim 1, wherein the wet chemical warfare agent waste object is first provided by treating a chemical agent hazardous waste object with a liquid bleach solution, and the wet chemical agent waste object is then covered by the closed cell foam in the second step without first drying the wet chemical agent waste object.

22. The method of claim 1, wherein the wet chemical warfare agent waste object comprises liquid chemical warfare agent simulant.

* * * * *